США005088109A

United States Patent [19]
Schenk

[11] Patent Number: 5,088,109
[45] Date of Patent: Feb. 11, 1992

[54] CIRCUIT ARRANGEMENT FOR THE EQUALIZATION OF DIGITAL SIGNALS RECEIVED IN ANALOG FORM

[75] Inventor: Heinrich Schenk, Munich, Fed. Rep. of Germany

[73] Assignee: Siemens Aktiengesellschaft, Berlin and Munich, Fed. Rep. of Germany

[21] Appl. No.: 412,744

[22] Filed: Sep. 26, 1989

[30] Foreign Application Priority Data

Sep. 29, 1988 [EP] European Pat. Off. ........ 88116124.4

[51] Int. Cl.$^5$ .............................................. H03H 7/30
[52] U.S. Cl. .................................... 375/14; 333/18
[58] Field of Search ............... 375/4, 14, 12; 333/18; 328/151; 379/410; 364/724.2

[56] References Cited

U.S. PATENT DOCUMENTS

| 4,288,872 | 9/1981 | Tauburelli | 375/14 |
| 4,504,958 | 3/1985 | Tamburelli | 375/12 |
| 4,789,994 | 12/1987 | Randal et al. | 375/12 |
| 4,833,691 | 5/1989 | Takatori et al. | 375/14 |
| 4,878,229 | 10/1989 | Szechcuyi | 375/14 |
| 4,896,318 | 1/1990 | Kokubo et al. | 370/32.1 |

OTHER PUBLICATIONS

1974 Intl. Zurich Seminar on Digital Comm., Horvath, Jr., "Comparative Performance of Linear Equalizers Using A Recursive Sampled-Data Filter", pp. H7(1)–H7(7).
"Adaptive Kanalentzerrung for Ubernyquist-Baudraten", S. von Hentschke, Jul./Aug. 1984, pp. 239–248.
NTG Tech. Reports 88, "Approaches to the Integrated Communication Network", pp. 50 to 57.

Primary Examiner—Benedict V. Safourek
Assistant Examiner—Tesfaldet Bocure
Attorney, Agent, or Firm—Adel A. Ahmed

[57] ABSTRACT

An equalizer arrangement is used in a digital signal receiving system for the equalization of digital signals received in analog form and transmitted through an analog/digital converter, which have been distorted by a precursor and postcursor effects of previously transmitted or subsequent digital signals. The equalizer arrangement has a precursor equalizer followed by a postcursor equalizer connected with it. A compromise equalizer, which is connected upstream of the precursor equalizer, receives a sample value which is applied to it for each transmitted digital signal and is designed as a first-order filter with the following transmission function:

$$H(z) \frac{\frac{-A}{2} + Z^{-1}}{1 + A Z^{-1}}$$

4 Claims, 1 Drawing Sheet

CIRCUIT ARRANGEMENT FOR THE EQUALIZATION OF DIGITAL SIGNALS RECEIVED IN ANALOG FORM

CROSS REFERENCE TO RELATED APPLICATION

This application is related to commonly owned, co-pending U.S. patent application Ser. No. 07/412,760 filed Sept. 26, 1989, by the inventor and entitled "Circuit Arrangement for the Equalization of Digital Signals Received in Analog Form", now issued as U.S. Pat. No. 5,027,370.

BACKGROUND OF THE INVENTION

The present invention relates to an equalizer arrangement for a digital signal receiving system, and, more particularly, to such an arrangement having a compromise equalizer that implements a prescribed transfer function.

Circuit arrangements of this type are already generally known (see e.g., NTG Technical Reports 88, "Approaches to the Integrated Communication Network," pages 50 to 57), for the purpose of equalizing digital signals that have been transmitted by means of an analog transmission process and have therefore been subjected to distortion both by precursors of the subsequent digital signals and by precursors of received digital signals. In particular, strong linear distortions occur in the digital subscriber lines of the (ISDN) Integrated Services Digital Network, which must be eliminated by appropriate regeneration methods in the digital signal receiving equipment. The distortions caused by precursors are generally minor. For example, a transversal filter with two to four filter coefficients is sufficient for equalization. On the other hand, distortions that are caused by postcursors are very large. They can be compensated, for example, by a equalizer connected upstream of the decision feedback equalizer. The number of regenerator coefficients in this case lies between 20 and 40. However, in the case of digital signals with higher values, such as those coded according to a 2B1Q line code, convergence and stability problems may occur in equalizers of this kind when distortions are severe.

SUMMARY OF THE INVENTION

It is therefore an object of the present invention to provide an equalizer arrangement for improving the convergence and stability features of a circuit arrangement wherein a compromise equalizer having a prescribed transfer function is utilized.

The previous object above is accomplished in an equalizer arrangement for a digital signal receiving system by a compromise equalizer having a prescribed transfer function. The invention has the advantage that in the case of successive digital signals, precursor distortions of the subsequent digital signals, as well as postcursor distortions of the signals which have been transmitted, are reduced with the help of the compromise equalizer, so that the convergence and stability features of the equalizer arrangement improve.

Two illustrative embodiments of a compromise equalizer in accordance with the principles of the invention are disclosed that are particularly advantageous in terms of the minimal additions to the circuitry that they entail.

In implementing the compromise equalizer, according to one of the two illustrative embodiments, it has proved desirable to select the predetermined factor so that $A = 2^{-L}$, where L is a whole number.

BRIEF DESCRIPTION OF THE DRAWING

Features of the invention and additional objects of the invention will be more readily appreciated and better understood by reference to the following detailed description which should be considered in conjunction with the drawing.

DETAILED DESCRIPTION

Figure 1:
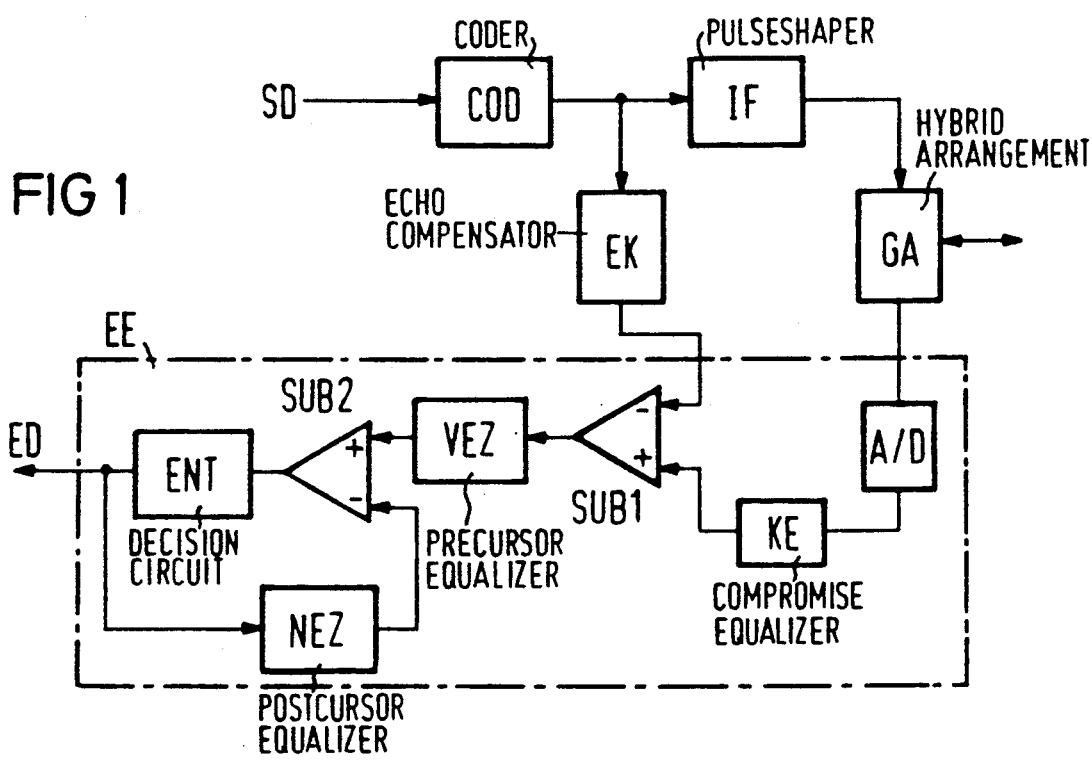
FIG. 1 illustrates a block diagram of a digital subscriber line system wherein the invention is employed to advantage.

A digital subscriber line system illustrated in FIG. 1 could be designed, for example, for the duplex transmission of digital signals over a two-wire line in the duplex channel system. A subscriber line system of this type first converts, with the aid of a coder COD the binary signals SD, such as telecommunications signals, that are to be transmitted over the two-wire line—into multistage signals for example, into digital signals coded according to the 2B1Q line code. The 2B1Q line code, which is a quaternary code with the levels of $+1$, $-1$, $+3$ and $-3$, is well known to those skilled in the art. The digital signals are then pulse—shaped and converted to analog signals by a pulse shaper IF. The analog signals are received by a hybrid arrangement GA.

Analog signals received by the hybrid arrangement GA are outputted to at the digital signal receiver EE. The input of this receiver includes an analog/digital converter A/D, which obtains samples from the received analog signals, for example, at an interval corresponding to one bit length of the transmitted digital signals and converts each sample into a digital signal having a prescribed number of bits. The synchronized clocking pulses required for this purpose are understood to be supplied by a clock unit not shown here.

The digital signals supplied by the analog/digital converter A/D first pass through a compromise equalizer KE and are then fed successively to a subtractor SUB1 which simultaneously receives compensation signals from an echo compensator EK. These compensation signals compensate for the echo signal components contained in the digital signals, which, during the transmission of a digital signals in analog form over the two-wire line as described above, have been superimposed on the received analog signals as the result of reflections on the line or as a result of incomplete decoupling of the transmission paths of the hybrid arrangement. Echo compensation is well known to the prior art.

The digital signals, now compensated, are then routed, for any further processing that may be necessary, through a control amplifier (not shown here) to an equalizer arrangement, which eliminates most of the distortions of the digital signals caused by the electrical characteristics of the two-wire line which have not yet been eliminated by the compromise equalizer KE. The equalizer arrangement in this case may have, for example, a precursor equalizer VEZ, whose output signals are applied to one input(+) of a subtractor SUB2. A second input(−) of this subtractor SUB2 is connected to the output of a postcursor equalizer NEZ. The input of the postcursor equalizer NEZ is connected to the output of a decision-circuit ENT, which is connected to an output of substractor SUB2. The equalized digital signals ED that arrive at the output of this decision-circuit ENT are then routed to other devices, not shown in FIG. 1, for subsequent utilization.

What follows describes only the details of the compromise equalizer KE, since the mode of operation of the other circuit components of the subscriber line system shown in FIG. 1 is already understood to be sufficiently familiar to those skilled in the art.

The compromise equalizer KE is implemented as a first-order filter providing a transmission function in the following form:

$$H(z) = \frac{\frac{-A}{2} + Z^{-1}}{1 + A Z^{-1}} \quad (1)$$

where z is variable defining the z transform.

This transmission function H(2) is accomplished by circuit arrangements that equalize sample values x(n) with n = 1, ..., p, supplied by the analog/digital converter A/D at prescribed sampling times, according to the following equations:

$$y(n) = x(n-1) - Ay(n-1) - A/2\, x(n) \quad (2)$$

or $$y(n) = -A(y(n-1) + \tfrac{1}{2}x(n)) + x(n-1) \quad (3)$$

where y(n) and y(n−1) are digital signals arriving at the output of the compromise equalizer KE at the times n and n−1; x(n−1) is a sample value at the time n−1; and A is a predetermined constant.

Figure 2:
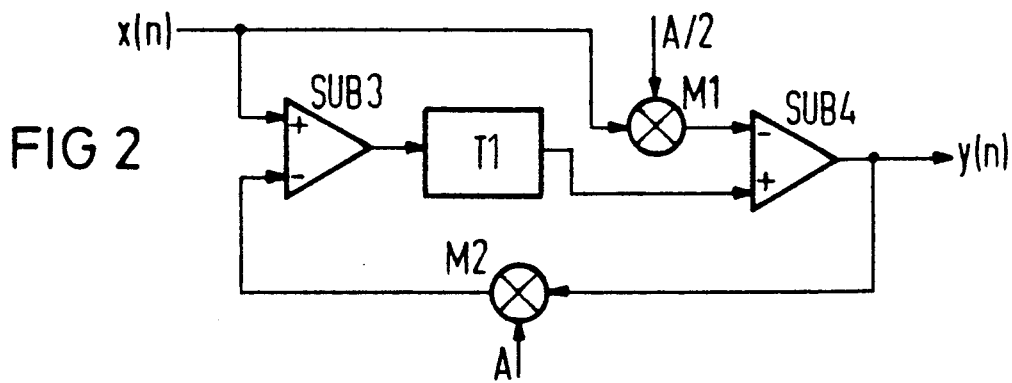
FIG. 2 depicts one illustrative embodiment of a compromise equalizer.

FIG. 2 illustrates a compromise equalizer KE in accordance with equation (2). Thus on its input side it has a subtractor SUB3, to one of whose inputs (+) the sample values x(n) are fed. These sample values x(n) are also inputted to a multiplier M1, which multiplies the sample values x(n) by the predetermined constant A/2. The output of this multiplier M1 is connected to a first input (−) of a subtractor SUB4, at whose output an equalized output signal y(n) is developed which is assigned to the respective sample values x(n).

Each of the output signals y(n) is also fed as an input signal to a multiplier M2 that receives the predetermined constant A. The output of this multiplier is connected to a second input (−) of the subtractor SUB3. The output signal of the subtractor SUB3 is transmitted through a delay element T1 to a second input (+) of the subtractor SUB4. In this case, the delay element T1 produces a delay in the signal that corresponds to the interval between two sucessive sample values.

Figure 3:
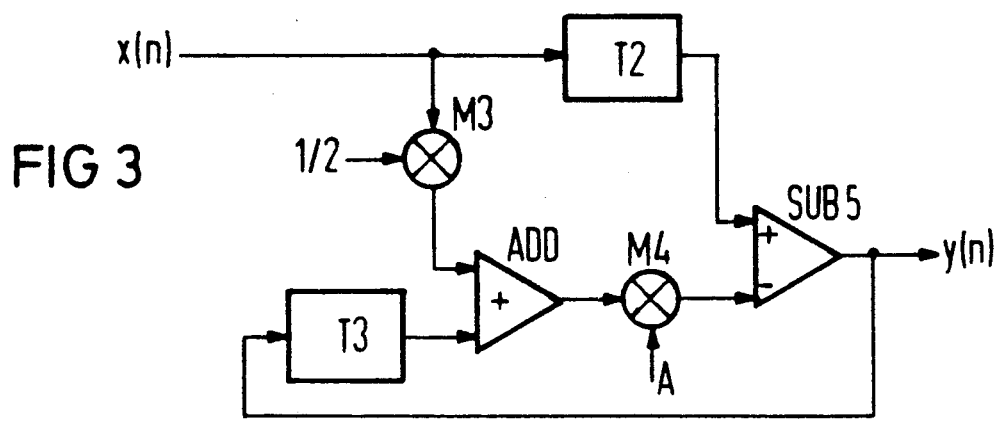
FIG. 3 shows a second embodiment for a compromise equalizer.

FIG. 3 illustrates a compromise equalizer KE implemented in accordance with equation (3). The sample values x(n) fed to it by the analog/digital converter A/D pass through a delay element T2 to an input (+) of a subtractor SUB5. At the output of the subtractor SUB5 an equalized output signal y(n) is produced which is assigned to the respective sample values x(n). In this case the delay element T2 produces a delay in the respective sample value that corresponds to the time interval between two successive sample values.

Each of the sample values x(n) is also received by one input of a multiplier M3, which receives at its other input a predetermined constant having the value of one-half. The output of multiplier M3 is connected to a first input of an adder ADD. A second input of this adder ADD is connected through another delay element T3 to the output y(n) of the subtractor SUB5. This delay element T3, too, produces a delay in the signal which corresponds to the time interval between two successive sample values.

The output signal of the adder ADD is fed to a multiplier M4, which multiplies it by the predetermined constant A and transmits the resulting product signal to another input (−) of the subtractor SUB5. It has proved desirable for the compromise equalizers KE illustrated in FIGS. 2 and 3 to have the predetermined constant selected so that $A = 2^{-L}$, where L is a whole number.

Finally, it should be noted that with the aid of FIGS. 2 and 3, two illustrative embodiments of a compromise equalizer KE have been described which performs an equalization of sample values fed to it according to the transfer function (1) given above. In addition, however, the compromise equalizer KE according to the present invention can also be implemented in a manner other than that shown in FIGS. 2 and 3. Thus, for example, it is also possible for this regenerator to be implemented as in the form of a digital processor. In addition, the compromise equalizer KE, aside from that in FIG. 1, can also be connected directly upstream of the precursor equalizer.

There has thus been shown and described a novel compromise equalizer which fulfills all the objects and advantages sought therefor. Many changes, modifications, variations and other uses and applications of the subject invention will, however, become apparent to those skilled in the art after considering this specification and the accompanying drawing which disclose the preferred embodiments thereof. All such changes, modifications, variations and other uses and applications which do not depart from the spirit and scope of the invention are deemed to be covered by the invention which is limited only by the claims which follow.

I claim:

1. An adaptively adjustable equalizer arrangement for removing precursor and postcursor effects from a digital input signal, comprising:

compromise equalizer means connected upstream of a precursor equalizer means and a postcursor equalizer means for reducing said precursor and postcursor effects from said digital signal, said compromise equalizer means having an input adapted to receive said digital signal and having a transfer function $$H(z) = [-A/2 + Z^{-1}]/[1 + AZ^{-1}]$$

where A is a positive real number; Where z is variable defining the z transform, precursor equalizer means, responsive to an output of said compromise equalizer means, for removing said precursor effects from said output of said compromise equalizer means; and postcursor equalizer means, responsive to an output of said precursor equalizer means, for removing said postcursor effects from said output of said precursor equalizer means;

such that the stability and convergence characteristics of the adaptively adjustable equalizer are improved.

2. An adaptively adjustable equalizer arrangement according to claim 1, wherein said output of said compromise equalizer means is $$y_n = x_{n-1} - Ay_{n-1} - \tfrac{1}{2}Ax_n$$

where n is a positive integer, $y_{n-1}$ is the n−1th output of said compromise equalizer means, $x_n$ is the nth input to said compromise equalizer means and $x_{n-1}$ is the n−1th input to said compromise equalizer means.

3. An adaptively adjustable equalizer arrangement according to claim 1, wherein said output of said compromise equalizer means is $$y_n = -A(y_{n-1} + \tfrac{1}{2}x_n) + x_{n-1}$$

where n is a positive integer, $y_{n-1}$ is the n−1th output of said compromise equalizer means, $x_n$ is the nth input to said compromise equalizer means and $x_{n-1}$ is the n−1th input to said compromise equalizer means.

4. An adaptively adjustable equalizer arrangement according to claim 1, wherein $A = 2^{-L}$, where L is an integer.

* * * * *